United States Patent
Wu et al.

(10) Patent No.: US 12,224,683 B2
(45) Date of Patent: Feb. 11, 2025

(54) POWER CONVERSION SYSTEM AND METHOD THEREOF

(71) Applicant: Richtek Technology Corporation, HsinChu (TW)

(72) Inventors: Tsan-Huei Wu, Yunlin (TW); Tsung-Wei Huang, Taipei (TW); Ye-Sing Luo, Hsinchu (TW)

(73) Assignee: RICHTEK TECHNOLOGY CORPORATION, Zhubei (TW)

( * ) Notice: Subject to any disclaimer, the term of this patent is extended or adjusted under 35 U.S.C. 154(b) by 122 days.

(21) Appl. No.: 18/337,154

(22) Filed: Jun. 19, 2023

(65) Prior Publication Data
US 2024/0356459 A1    Oct. 24, 2024

(30) Foreign Application Priority Data
Apr. 20, 2023    (TW) .................. 112114761

(51) Int. Cl.
| | |
|---|---|
| H02M 3/158 | (2006.01) |
| H02J 7/00 | (2006.01) |
| H02M 1/00 | (2007.01) |
| H02M 7/5395 | (2006.01) |
| H02M 3/156 | (2006.01) |

(52) U.S. Cl.
CPC ......... *H02M 7/5395* (2013.01); *H02J 7/0068* (2013.01); *H02M 1/0012* (2021.05); *H02M 1/0019* (2021.05); *H02M 1/0025* (2021.05); *H02M 3/158* (2013.01); *H02J 2207/20* (2020.01); *H02M 3/1566* (2021.05)

(58) Field of Classification Search
CPC ............ H02M 1/0003; H02M 1/0012; H02M 1/0019; H02M 1/0022; H02M 1/0025; H02M 1/0045; H02M 1/083; H02M 1/32; H02M 3/156; H02M 3/1566; H02M 3/157; H02M 3/158; H02M 3/1582; H02M 3/1584; H02M 7/538; H02M 7/5395; H02J 7/0068; H02J 2207/20
See application file for complete search history.

(56) References Cited

U.S. PATENT DOCUMENTS

2018/0090945 A1*    3/2018 Langlinais .......... H02M 3/1582
2021/0203179 A1*    7/2021 Gambetta ........... H02M 3/1582
(Continued)

*Primary Examiner* — Scott Bauer
*Assistant Examiner* — Shahzeb K Ahmad
(74) *Attorney, Agent, or Firm* — Tung & Associates (57) ABSTRACT

A power conversion system includes: first and second switches, a switching power converter, a battery switch and a conversion control circuit. In an external power mode, the first and second switches are controlled to generate an intermediate power from a first power and generate a second power from the intermediate power for powering an external load. In a battery power mode, the conversion control circuit controls the battery switch, the switching power converter and the second switch to generate a system power from a battery power, convert the system power to generate the intermediate power and generate the second power from the intermediate power. In the external power mode, the switching power converter is controlled to enter the battery power mode when the intermediate voltage is reduced to a transient state threshold, wherein a minimum voltage level of the intermediate power is close to a minimum voltage regulation level.

20 Claims, 8 Drawing Sheets

(56) References Cited

U.S. PATENT DOCUMENTS

| | | | |
|---|---|---|---|
| 2021/0257852 A1 | 8/2021 | Toyoda | |
| 2022/0255433 A1* | 8/2022 | Wen | H02M 3/158 |
| 2022/0311265 A1* | 9/2022 | Huang | H02J 7/34 |
| 2022/0376515 A1* | 11/2022 | Singh | H02M 3/158 |
| 2023/0047446 A1* | 2/2023 | Liu | H02J 7/0016 |

* cited by examiner

Fig. 10

POWER CONVERSION SYSTEM AND METHOD THEREOF

CROSS REFERENCE

The present invention claims priority to TW 112114761 filed on Apr. 20, 2023.

BACKGROUND OF THE INVENTION

Field of Invention

The present invention relates to a power conversion system and a power conversion method thereof. Particularly, it relates to such power conversion system and such power conversion method capable of preventing unwanted abrupt low voltage during input power transient.

Description of Related Art

Figure 1A:
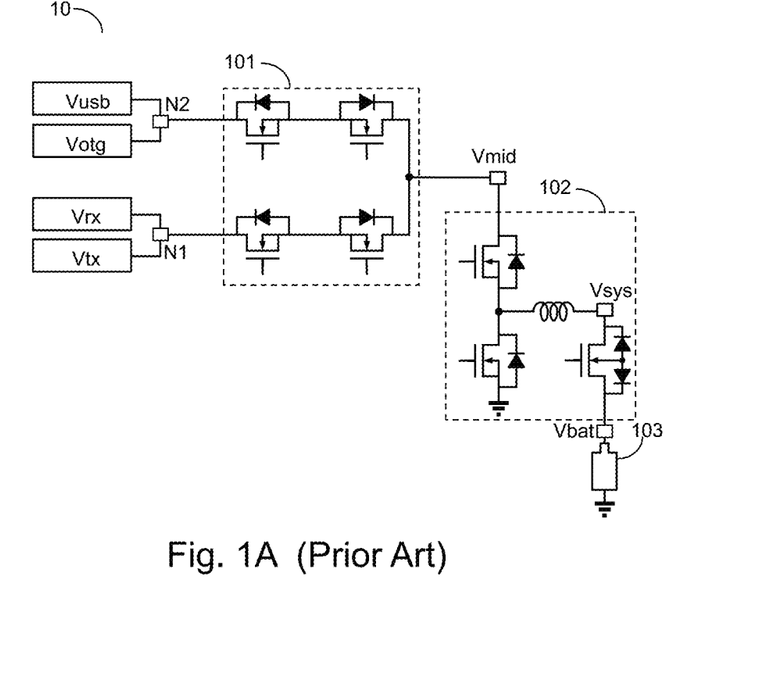
FIG. 1A shows a schematic circuit diagram of a conventional power conversion system.
Figure 1B:
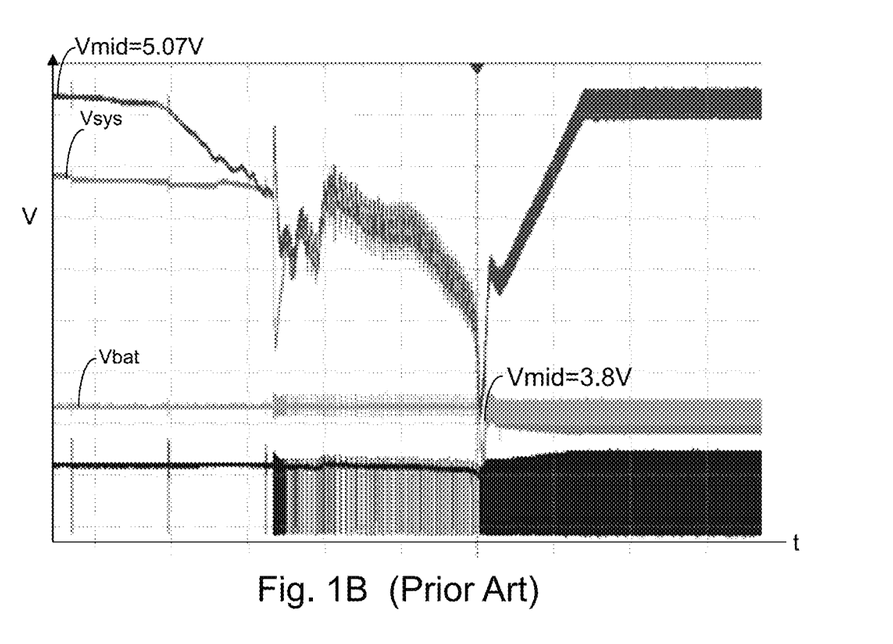
FIG. 1B illustrates signal waveform diagrams depicting signals associated with the operation of a conventional power conversion system.

Please refer to FIG. 1A, which shows a schematic circuit diagram of a conventional power conversion system. As shown in FIG. 1A, the conventional power conversion system 10 includes: an input power Vusb, an output power Votg, a wireless receiver power Vrx, a wireless transmitter end power Vtx, a multiplexer 101, a converter 102 and a battery 103. The wireless receiver power Vrx at a first terminal N1 can not only supply power to a system load coupled to a system voltage Vsys via the converter 102, but also supply power to an external load which is externally coupled to the output power Votg. The input power Vusb at a second terminal N2 can not only supply power to the system load coupled to the system voltage Vsys via the converter 102, but also supply power to an external load which is externally coupled to the wireless transmitter end power Vtx. The prior art shown in FIG. 1A has following drawbacks that: in the above-mentioned two scenarios, when a power supply is cut off (e.g., when the wireless receiver power Vrx is incapable of receiving wireless power), it will incur an intermediate voltage Vmid to be ramped down rapidly. When the intermediate voltage Vmid is lower to a point where the intermediate voltage Vmid has reached an under-voltage lockout level of the external load which is externally coupled to the output power Votg, the external load will cease its operation. Please refer to FIG. 1B, which illustrates signal waveform diagrams depicting signals associated with the operation of a conventional power conversion system. FIG. 1B demonstrates practical test results in a case where the wireless receiver power Vrx is abruptly removed. As shown in FIG. 1B, the intermediate voltage Vmid is ramped down rapidly from 5.07V to a battery voltage of 3.8V, which may incur the external load, externally connected to the output power Votg, to be reset or shut down.

In view of the above, to overcome the drawbacks in the prior art, the present invention proposes a power conversion system and a power conversion method of such power conversion system capable of preventing unwanted abrupt low voltage during input power transient.

SUMMARY OF THE INVENTION

From one perspective, the present invention provides a power conversion system, comprising: a first switch, which is coupled between a first terminal and an intermediate node; a second switch, which is coupled between a second terminal and the intermediate node; a switching power converter, which is coupled between the intermediate node and a system node; a battery switch, which is coupled between the system node and a battery; and a conversion control circuit, which is configured to operably control the first switch, the second switch, the battery switch and the switching power converter, so as to control power conversion among a first power at the first terminal, a second power at the second terminal, an intermediate power at the intermediate node, a system power at the system node and a battery power at the battery; wherein in an external power supply mode, the conversion control circuit is configured to operably control the first switch to be ON to conduct the first power to generate the intermediate power, and the conversion control circuit is configured to operably control the second switch to be ON to conduct the intermediate power to generate the second power for powering an external load, and the conversion control circuit is configured to operably control the switching power converter to convert the intermediate power to the system power for powering a system load; wherein in a battery power supply mode, the conversion control circuit is configured to operably control the battery switch to be ON to conduct the battery power to generate the system power, and the conversion control circuit is configured to operably control the switching power converter to convert the system power to the intermediate power, and the conversion control circuit is configured to operably control the second switch to be ON to conduct the intermediate power to generate the second power for powering the external load, wherein the intermediate power includes an intermediate voltage, wherein the intermediate voltage is regulated to an intermediate regulation level; wherein in the external power supply mode, when the intermediate voltage is reduced to a transient state threshold, the conversion control circuit is configured to operably control the switching power converter to enter the battery power supply mode, wherein the intermediate regulation level is close to a minimum voltage regulation level or the intermediate regulation level is not lower than the minimum voltage regulation level.

From another perspective, the present invention provides a power conversion method, comprising following steps: in an external power supply mode, controlling a first switch to be ON to conduct a first power at a first terminal to generate an intermediate power at an intermediate node, and controlling a second switch to be ON to conduct the intermediate power to generate a second power at a second terminal for powering an external load, and controlling a switching power converter to convert the intermediate power to a system power at a system node for powering a system load; wherein the first switch is coupled between the first terminal and the intermediate node, the second switch is coupled between the second terminal and the intermediate node and the switching power converter is coupled between the intermediate node and the system node; and in a battery power supply mode, controlling a battery switch to be ON to conduct a battery power of a battery to generate the system power, and controlling the switching power converter to convert the system power to the intermediate power, and controlling the second switch to be ON to conduct the intermediate power to generate the second power for powering the external load; wherein the battery switch is coupled between the system node and the battery, wherein the intermediate power includes an intermediate voltage, wherein the intermediate voltage is regulated to an intermediate regulation level; wherein in the external power supply mode, the switching power converter is controlled to enter the battery power supply mode when the intermediate voltage is reduced to a transient state threshold, wherein the intermediate regulation level is close to a minimum voltage regulation level or the intermediate regulation level is not lower than the minimum voltage regulation level.

In one embodiment, in the external power supply mode, when the intermediate voltage is reduced to the transient state threshold, the switching power converter enters the battery power supply mode, the switching power converter enters the battery power supply mode, after the conversion control circuit controls the switching power converter to perform a transient state operation, such that a minimum of the intermediate voltage is not lower than the intermediate regulation level; wherein during a transient state operation time period, the conversion control circuit is configured to operably control the switching power converter to perform the transient state operation in an open-loop scheme. {after}

In one embodiment, the transient state threshold is equal to the intermediate regulation level.

In one embodiment, the transient state threshold is equal to a sum of the intermediate regulation level and a predetermined offset value, wherein the predetermined offset value is sufficiently large to an extent that the minimum of the intermediate voltage is not lower than the intermediate regulation level.

In one embodiment, the first power is a wireless receiver power and/or the second power is an output power complying with a supplement to the Universal Serial Bus (USB) specification for USB On-The-Go (USB OTG).

In one embodiment, in the external power supply mode, the switching power converter is configured to operably convert the intermediate power to the system power via a buck conversion scheme, and wherein in the battery power supply mode, the switching power converter is configured to operably convert the system power to the intermediate power via a boost conversion scheme.

In one embodiment, the conversion control circuit includes: a multi-loop error amplifier circuit, which is configured to operably generate a multi-loop error amplification signal; a pulse width modulation (PWM) comparator, which is configured to operably compare the multi-loop error amplification signal with a ramp signal to generate a PWM signal, wherein the PWM signal is configured to operably control at least one conversion switch, of the switching power converter, for switching, so as to regulate a system voltage of the system power in the external power supply mode or regulate the intermediate voltage in the battery power supply mode; and a transient state control circuit, which is configured to operably adjust the multi-loop error amplification signal in the transient state operation, so as to control the switching of the at least one conversion switch of the switching power converter, such that the minimum of the intermediate voltage is not lower than the intermediate regulation level.

In one embodiment, the transient state operation time period is a constant time period, or wherein the transient state operation time period starts when the intermediate voltage is reduced to the transient state threshold and ends when a system voltage of the system power is equal to a battery voltage of the battery power.

In one embodiment, the multi-loop error amplifier circuit includes: a first amplifier and a second amplifier; wherein in the external power supply mode, the first amplifier is configured to operably amplify a difference between a constant voltage mode reference voltage and a system feedback voltage related to the system voltage, so as to generate the multi-loop error amplification signal; wherein in the battery power supply mode, the second amplifier is configured to operably amplify a difference between an intermediate feedback voltage related to the intermediate voltage and an intermediate reference voltage, so as to generate the multi-loop error amplification signal; wherein the second amplifier is further configured to operably compare the intermediate feedback voltage with the intermediate reference voltage, so as to generate a transient state trigger signal which indicates whether the intermediate voltage is reduced to the transient state threshold; wherein the transient state control circuit includes: a bypass switch, which is coupled between the multi-loop error amplification signal and the ramp signal; and a timer circuit, which is configured to operably control the bypass switch, based upon the transient state trigger signal, to be ON to conduct the multi-loop error amplification signal to the ramp signal, thereby accomplishing the transient state operation; wherein after the timer circuit has counted for the constant time period, the timer circuit is configured to operably control the bypass switch to be OFF, so as to cease conducting the multi-loop error amplification signal to the ramp signal; or wherein the timer circuit is configured to operably control the bypass switch to be OFF, when the system voltage is determined to be equal to the battery voltage, to cease conducting the multi-loop error amplification signal to the ramp signal.

In one embodiment, in the external power supply mode, when the intermediate voltage is reduced to the transient state threshold, the switching power converter enters the battery power supply mode, after the conversion control circuit controls the switching power converter to perform a transient state operation, such that a minimum of the intermediate voltage is not lower than the intermediate regulation level; wherein during a transient state operation time period, controlling the switching power converter to perform the transient state operation in an open-loop scheme.

In one embodiment, the step of controlling the switching power converter to convert the intermediate power to the system power or the step of controlling the switching power converter to convert the system power to the intermediate power includes following steps: generating a multi-loop error amplification signal; comparing the multi-loop error amplification signal with a ramp signal to generate a PWM signal, wherein the PWM signal is configured to operably control at least one conversion switch, of the switching power converter, for switching, so as to regulate a system voltage of the system power in the external power supply mode or regulate the intermediate voltage in the battery power supply mode; wherein the step of controlling the switching power converter to perform the transient state operation in the open-loop scheme during the transient state operation time period includes following steps: adjusting the multi-loop error amplification signal in the transient state operation, so as to control the at least one conversion switch, of the switching power converter, for switching, such that the minimum of the intermediate voltage is not lower than the intermediate regulation level.

In one embodiment, the step of generating the multi-loop error amplification signal includes following steps: in the external power supply mode, amplifying a difference between a constant voltage mode reference voltage and a system feedback voltage related to the system voltage, so as to generate the multi-loop error amplification signal; and in the battery power supply mode, amplifying a difference between an intermediate feedback voltage related to the intermediate voltage and an intermediate reference voltage, so as to generate the multi-loop error amplification signal.

In one embodiment, the step of controlling the switching power converter to convert the intermediate power to the system power or the step of controlling the switching power converter to convert the system power to the intermediate power further includes following steps: comparing the intermediate feedback voltage with the intermediate reference voltage, so as to generate a transient state trigger signal which indicates whether the intermediate voltage is reduced to the transient state threshold.

In one embodiment, the step of adjusting the multi-loop error amplification signal in the transient state operation includes following steps: conducting the multi-loop error amplification signal to the ramp signal based upon the transient state trigger signal, so as to accomplish the transient state operation; and after the constant time period has been counted, ceasing conducting the multi-loop error amplification signal to the ramp signal; or when it is determined that the system voltage is equal to the battery voltage, ceasing conducting the multi-loop error amplification signal to the ramp signal.

As compared to the prior art, the present invention is advantageous in that: the present invention can ensure that an intermediate voltage will not be low to an extent that the intermediate voltage reaches to a battery voltage, such that unwanted reset or shutdown of an external load connected to an output power can be prevented.

The objectives, technical details, features, and effects of the present invention will be better understood with regard to the detailed description of the embodiments below, with reference to the attached drawings.

DESCRIPTION OF THE PREFERRED EMBODIMENTS

Figure 2:
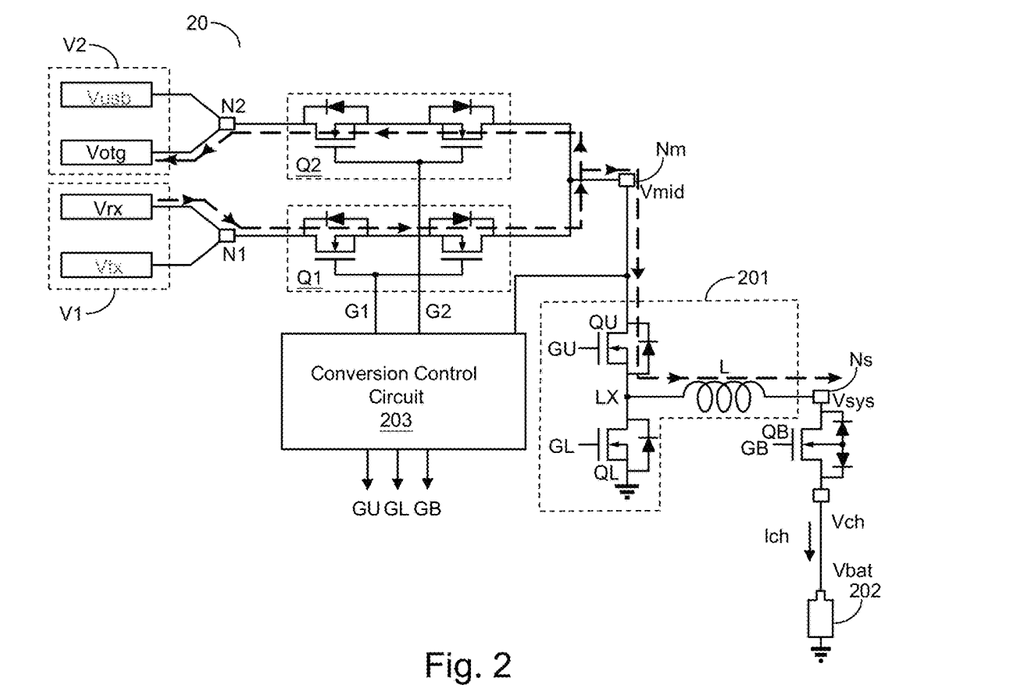
FIG. 2 shows a schematic circuit block diagram and a schematic operation diagram of a power conversion system according to an embodiment of the present invention.

The drawings as referred to throughout the description of the present invention are for illustration only, to show the interrelations between the circuits and the signal waveforms, but not drawn according to actual scale of circuit sizes and signal amplitudes and frequencies. For better understanding the essence of the present invention, practical implementation details will be described in the embodiments below. It should be understood that such details are not for limiting the broadest scope of the present invention Please refer to FIG. 2, which shows a schematic circuit block diagram and a schematic operation diagram of a power conversion system according to an embodiment of the present invention. As shown in FIG. 2, the power conversion system 20 of the present invention comprises: a first switch Q1, a second switch Q2, a switching power converter 201, a battery switch QB and a conversion control circuit 203. The first switch Q1 is coupled between a first terminal N1 and an intermediate node Nm, whereas, the second switch Q2 is coupled between a second terminal N2 and the intermediate node Nm. Each of the first switch Q1 and the second switch Q2 has each own two sub-switches, wherein respective body didoes of respective corresponding two sub-switches are reversely coupled to each other. The switching power converter 201 is coupled between the intermediate node Nm and a system node Ns. The battery switch QB is coupled between the system node Ns and a battery 202.

The conversion control circuit 203 is configured to operably generate control signals G1, G2, GB, GU and GL. The control signals G1, G2 and GB are configured to operably control the first switch Q1, the second switch Q2 and the battery switch QB, respectively, whereas, the control signals GU and GL are configured to operably control the switching power converter 201, so that the conversion control circuit 203 is configured to operably control power conversion among a first power (e.g., a first voltage V1) at the first terminal N1, a second power (e.g., a second voltage V2) at the second terminal N2, an intermediate power (e.g., an intermediate voltage Vmid) at the intermediate node Nm, a system power (e.g., a system voltage Vsys) at the system node Ns and a battery power (e.g., a system voltage Vbat) of the battery 202. In one embodiment, the power conversion system 20 of the present invention can be a bilateral power conversion system. As shown in FIG. 2, in an external power supply mode, the conversion control circuit 203 is configured to operably control the first switch Q1 to be ON to conduct the first power to generate the intermediate power, and the conversion control circuit 203 is configured to operably control the second switch Q2 to be ON to conduct the intermediate power to generate the second power for powering an external load. Besides, as shown in FIG. 2, in the external power supply mode, the conversion control circuit 203 is configured to operably control the switching power converter 201 to convert the intermediate power to the system power for powering a system load (e.g., central processing unit, CPU). Additionally, as shown in FIG. 2, in the external power supply mode, the conversion control circuit 203 is configured to operably control the battery switch QB to be ON, to convert the system power to a charging power (e.g., a charging voltage Vch or a charging current Ich) for charging the battery 202. In one embodiment, the first power is a wireless receiver power Vrx and/or the second power is an output power complying with a supplement to the Universal Serial Bus (USB) specification for USB On-The-Go (USB OTG). In another embodiment, the first power is an input power Vusb (e.g. compliant to USB PD spec.) and/or the second power is a wireless transmitter end power Vtx.

As shown in FIG. 2, in one embodiment, the switching power converter 201 includes: an upper gate switch QU and a lower gate switch QL. The upper gate switch QU is coupled between the intermediate node Nm and a switching node LX which is connected to one end of an inductor L, whereas, the lower gate switch QL is coupled between the switching node LX and a ground potential. The end of the inductor L is coupled to the system node Ns. The switching power converter 201 is configured to switch the inductor L to perform bilateral power conversion between the intermediate node Nm and the system node Ns. Note that the direction of the power conversion is selectable. As shown in FIG. 2, in one embodiment, in the external power supply mode, the switching power converter 201 is configured to operably convert the intermediate power to the system power via a buck conversion scheme.

Figure 3:
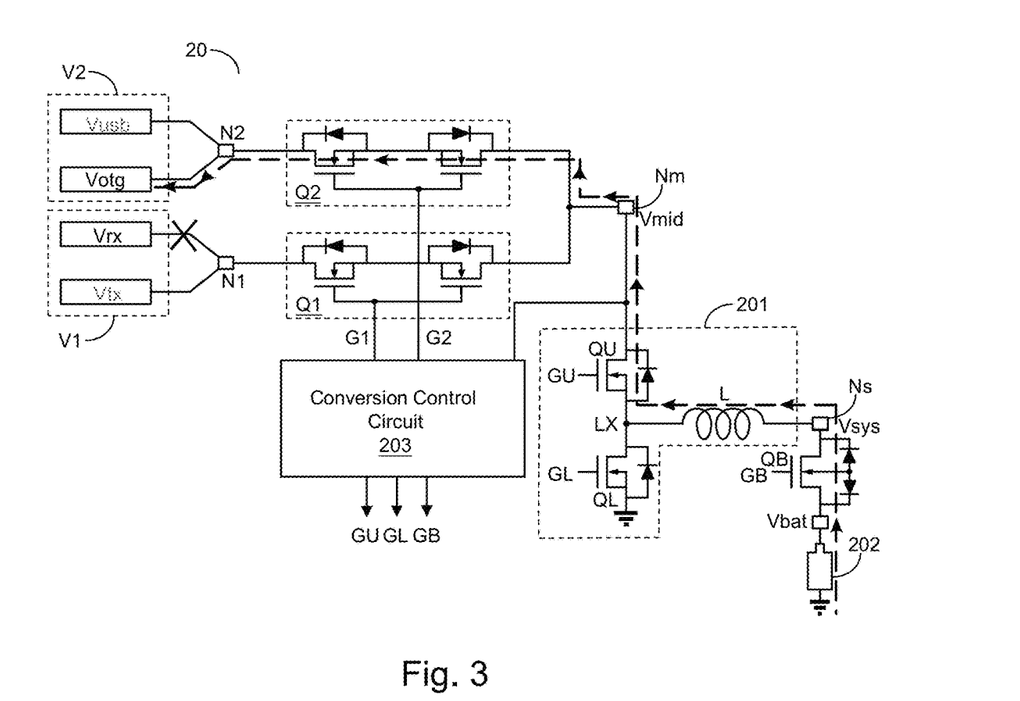
FIG. 3 shows a schematic circuit block diagram and a schematic operation diagram of a power conversion system according to another embodiment of the present invention.
Figure 4:
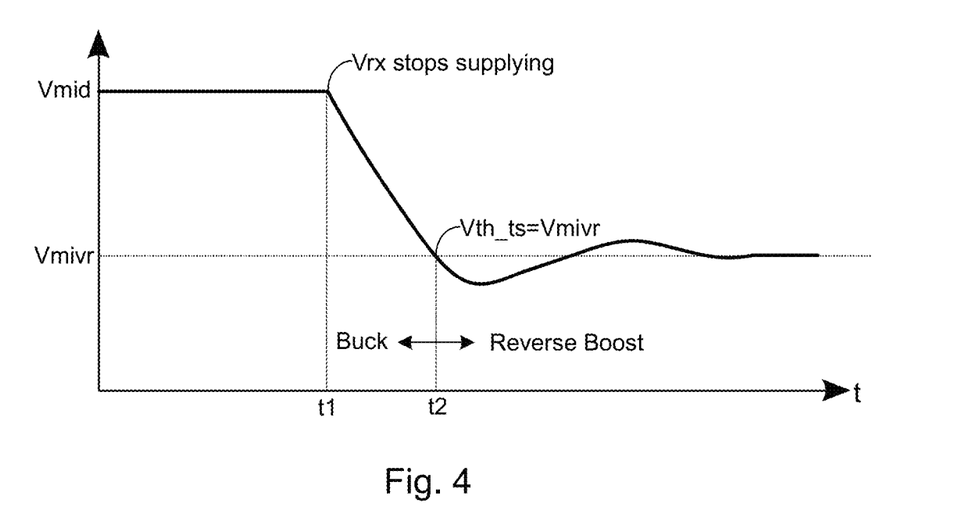
FIG. 4 illustrates signal waveform diagrams depicting signals associated with the operation of a power conversion system according to an embodiment of the present invention.

FIG. 3 shows a schematic circuit block diagram and a schematic operation diagram of a power conversion system according to another embodiment of the present invention. The power conversion system 20 of this embodiment shown in FIG. 3 is similar to the power conversion system 20 of the embodiment shown in FIG. 2, and the detailed descriptions regarding similar devices of this embodiment shown in FIG. 3 are not redundantly repeated here. The power conversion system 20 of this embodiment shown in FIG. 3 is different from the power conversion system 20 of the embodiment shown in FIG. 2 in that: a direction of a current path of this embodiment shown in FIG. 3 is different from a direction of a current path of the embodiment shown in FIG. 2. As shown in FIG. 3, when the first power (e.g., a wireless receiver power Vrx) stop supplying power (e.g., when the first power is removed), a battery power supply mode will be enabled. In the battery power supply mode, the conversion control circuit 203 is configured to operably control the battery switch QB to be ON to conduct the battery power to generate the system power, and the conversion control circuit 203 is configured to operably control the switching power converter 201 to convert the system power to the intermediate power, and the conversion control circuit 203 is configured to operably control the second switch Q2 to be ON to conduct the intermediate power to generate the second power for powering an external load. In one embodiment, when the first power is removed and the battery power supply mode is enabled, the first switch Q1 will be turned OFF. Please refer to FIG. 3 along with FIG. 4. FIG. 4 illustrates signal waveform diagrams depicting signals associated with the operation of a power conversion system according to an embodiment of the present invention. As shown in FIG. 4, in one embodiment, the intermediate voltage Vmid is regulated to an intermediate regulation level Vmivr. As shown in FIG. 4, in the external power supply mode, when the intermediate voltage Vmid is reduced to a transient state threshold Vth_ts, the conversion control circuit 203 is configured to operably control the switching power converter 201 to enter the battery power supply mode, such that a minimum of the intermediate voltage Vmid is close to the minimum voltage regulation level Vmivr. As shown in FIG. 3, in one embodiment, in the battery power supply mode, the switching power converter 201 is configured to operably convert the system power to the intermediate power via a boost conversion scheme.

In one embodiment,

As described above, FIG. 4 illustrates signal waveform diagrams depicting signals associated with the operation of a power conversion system according to an embodiment of the present invention. The intermediate voltage Vmid is shown in FIG. 4. For example, a wireless receiver power Vrx stops supplying power at a time point t1. In this embodiment, a transient state threshold Vth_ts is equal to an intermediate regulation level Vmivr. At a time point t2 when the transient state threshold Vth_ts is equal to the intermediate regulation level Vmivr, the power conversion system 20 transits from the external power supply mode to the battery power supply mode. In other words, the switching power converter 201 is controlled to transit from the buck mode to the boost mode (also referred as "a reverse boost mode").

Figure 5:
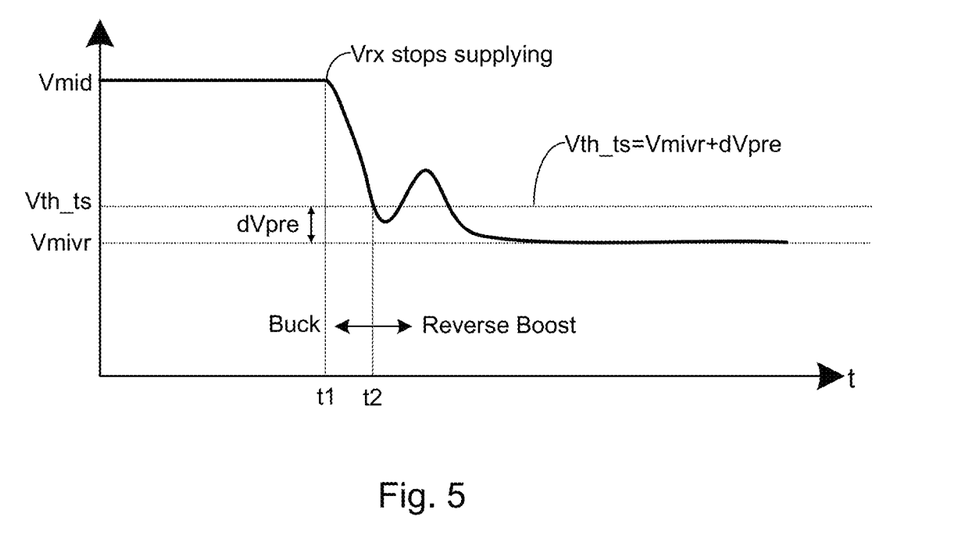
FIG. 5 illustrates signal waveform diagrams depicting signals associated with the operation of a power conversion system according to another embodiment of the present invention.

FIG. 5 illustrates signal waveform diagrams depicting signals associated with the operation of a power conversion system according to another embodiment of the present invention. The intermediate voltage Vmid is shown in FIG. 5. In this embodiment, a transient state threshold Vth_ts is equal to a sum of a minimum voltage regulation level Vmivr and a predetermined offset value dVpre, wherein the predetermined offset value dVpre is sufficiently large to an extent that the minimum of the intermediate voltage Vmid is not lower than the minimum voltage regulation level Vmivr. At a time point t2 when the transient state threshold Vth_ts is equal to the sum of the minimum voltage regulation level Vmivr and the predetermined offset value dVpre, the power conversion system 20 transits from the external power supply mode to the battery power supply mode. In other words, the switching power converter 201 is controlled to transit from the buck mode to the reverse boost mode.

Figure 6:
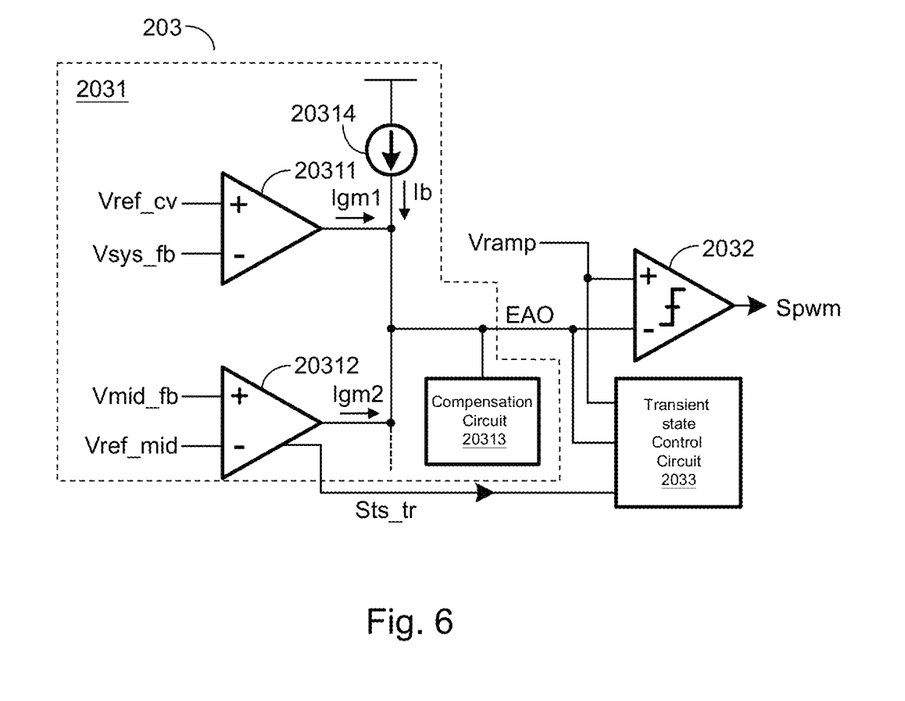
FIG. 6 shows a schematic circuit block diagram of a conversion control circuit in a power conversion system according to an embodiment of the present invention.

FIG. 6 shows a schematic circuit block diagram of a conversion control circuit in a power conversion system according to an embodiment of the present invention. As shown in FIG. 6, a conversion control circuit 203 includes: a multi-loop error amplifier circuit 2031, a pulse width modulation (PWM) comparator 2032 and a transient state control circuit 2033. The multi-loop error amplifier circuit 2031 is configured to operably generate a multi-loop error amplification signal EAO. Please refer to FIG. 6 along with FIG. 2. The PWM comparator 2032 is configured to operably compare the multi-loop error amplification signal EAO with a ramp signal Vramp to generate a PWM signal Spwm. The accordingly obtained PWM signal Spwm is configured to operably generate the control signal GU and the control signal GL, so as to control at least one conversion switch (e.g., the upper gate switch QU or the lower gate switch QL) of the switching power converter 201 for switching, thereby regulating the system voltage Vsys of the system power in the external power supply mode or thereby regulating the intermediate voltage Vmid in the battery power supply mode.

Figure 8A:
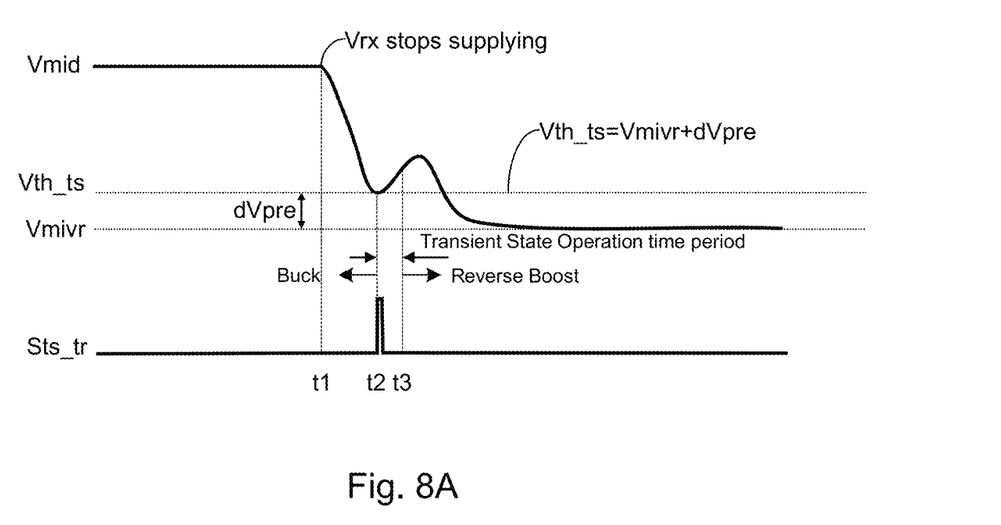
FIG. 8A illustrates signal waveform diagrams depicting signals associated with the operation of a power conversion system according to yet another embodiment of the present invention.

The transient state control circuit 2033 is configured to operably adjust the multi-loop error amplification signal EAO in the transient state operation, so as to control the switching of the at least one conversion switch (e.g., the upper gate switch QU or the lower gate switch QL) of the switching power converter 201, such that the minimum of the intermediate voltage Vmid is not lower than a minimum voltage regulation level Vmivr. Moreover, the transient state control circuit 2033 is configured to operably adjust the multi-loop error amplification signal EAO, so as to control the conversion control circuit 203 and the switching power converter 201, through elevating the intermediate voltage Vmid, to thereby perform an open-loop operation. As shown in FIG. 6, the multi-loop error amplifier circuit 2031 includes: a first amplifier 20311 and a second amplifier 20312. Please refer to FIG. 6 along with FIG. 2. In the external power supply mode, the first amplifier 20311 is configured to operably amplify a difference between a constant voltage mode reference voltage Vref_cv and a system feedback voltage Vsys_fb related to the system voltage Vsys, so as to generate the multi-loop error amplification signal EAO. In the battery power supply mode, the second amplifier 20312 is configured to operably amplify a difference between an intermediate feedback voltage Vmid_fb related to the intermediate voltage Vmid and an intermediate reference voltage Vref_mid, so as to generate the multi-loop error amplification signal EAO. In one embodiment, the first amplifier 20311 and the second amplifier 20312 can be implemented as transduction amplifiers. Consequently, under such circumstance, the first amplifier 20311 is configured to operably generate a first transduction current Igm1 according to the difference between the constant voltage mode reference voltage Vref_cv the system feedback voltage Vsys_fb related to the system voltage Vsys. The second amplifier 20312 is configured to operably generate a second transduction current Igm2 according to the difference between the intermediate feedback voltage Vmid_fb related to the intermediate voltage Vmid and the intermediate reference voltage Vref_mid. In one embodiment, the multi-loop error amplification signal EAO is linearly correlated with a relatively smaller one of the first transduction current Igm1 and the second transduction current Igm2. In one embodiment, in addition to the first amplifier 20311 and the second amplifier 20312, the conversion control circuit 203 further includes: a compensation circuit 20313 and a bias current source 20314. The bias current source 20314 is configured to provide a DC bias current Ib. The compensation circuit 20313 is configured to convert a superimposition result of the DC bias current Ib, the first transduction current Igm1 generated from the first amplifier 20311 and the second transduction current Igm2 generated from the second amplifier 20312, and the compensation circuit 20313 is configured to filter the accordingly converted superimposition result, hence generating a multi-loop error amplification signal EAO which is, for example, literally in a voltage form. Please refer to FIG. 6 along with FIG. 2 and FIG. 8A. FIG. 8A illustrates signal waveform diagrams depicting signals associated with the operation of a power conversion system according to yet another embodiment of the present invention. The second amplifier 20312 is further configured to operably compare the intermediate feedback voltage Vmid_fb with the intermediate reference voltage Vref_mid, so as to generate a transient state trigger signal Sts_tr which indicates whether the intermediate voltage Vmid is reduced to the transient state threshold Vth_ts.

Figure 7A:
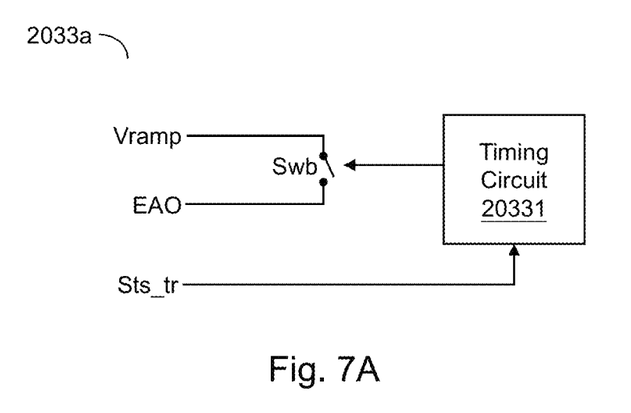
FIG. 7A shows a schematic circuit block diagram of a transient state control circuit of the conversion control circuit according to an embodiment of the present invention.

FIG. 7A shows a schematic circuit block diagram of a transient state control circuit of the conversion control circuit according to an embodiment of the present invention. Please refer to FIG. 7A along with FIG. 8A. In this embodiment, a transient state operation time period is a constant time period. As shown in FIG. 7A, a transient state control circuit 2033a includes: a bypass switch Swb and a timer circuit 20331. The bypass switch Swb is coupled between a multi-loop error amplification signal EAO and a ramp signal Vramp. The timer circuit 20331 is configured to operably control the bypass switch Swb based upon the transient state trigger signal Sts_tr, so as to conduct the multi-loop error amplification signal EAO to the ramp signal Vramp, thereby accomplishing the transient state operation. In one embodiment, the timer circuit 20331 is configured to operably control the bypass switch Swb to be OFF after the timer circuit 20331 has counted for the constant time period, so as to cease conducting the multi-loop error amplification signal EAO to the ramp signal Vramp. In one embodiment, the transient state control circuit 2033a is configured to control the bypass switch Swb to conduct the multi-loop error amplification signal EAO to the ramp signal Vramp, so as to control the conversion control circuit 203 and the switching power converter 201, through elevating the intermediate voltage Vmid, to thereby perform an open-loop operation.

Figure 7B:
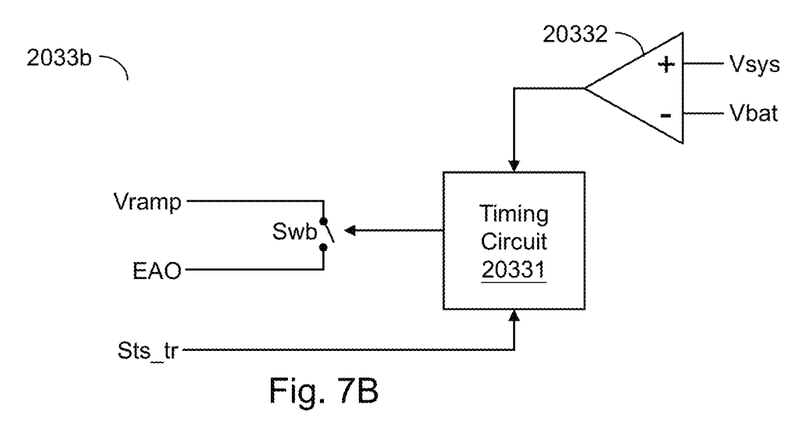
FIG. 7B shows a schematic circuit block diagram of a transient state control circuit of the conversion control circuit according to another embodiment of the present invention.

FIG. 7B shows a schematic circuit block diagram of a transient state control circuit of the conversion control circuit according to another embodiment of the present invention. The transient state control circuit 2033a of this embodiment shown in FIG. 7A is similar to the transient state control circuit 2033b of the embodiment shown in FIG. 7B, but is different in that: as compared to the transient state control circuit 2033a of this embodiment shown in FIG. 7A, the transient state control circuit 2033b of the embodiment shown in FIG. 7B further includes a comparison circuit 20332, which is configured to operably compare a system voltage Vsys with a battery voltage Vbat. Please refer to FIG. 7A along with FIG. 2 and FIG. 8A. In this embodiment, a transient state operation time period starts when the intermediate voltage Vmid is reduced to the transient state threshold Vth_ts and ends when the system voltage Vsys of the system power is equal to the battery voltage Vbat of the battery power. The timer circuit 20331 determines a time point when the system voltage Vsys is equal to the battery voltage Vbat in accordance with a comparison result of the comparison circuit 20332. As a result, in this case, when the system voltage Vsys is equal to the battery voltage Vbat, the timer circuit 20331 is configured to operably control the bypass switch Swb to be OFF, so as to cease conducting the multi-loop error amplification signal EAO to the ramp signal Vramp.

FIG. 8A illustrates signal waveform diagrams depicting signals associated with the operation of a power conversion system according to yet another embodiment of the present invention. The intermediate voltage Vmid and the transient state trigger signal Sts_tr are shown in FIG. 8A. Please refer to FIG. 2 along with FIG. 8A. In the external power supply mode, at a time point t2 shown in FIG. 8A, when the intermediate voltage Vmid is reduced to the transient state threshold Vth_ts, the transient state trigger signal Sts_tr will generate a pulse. In addition, in the external power supply mode, when the intermediate voltage Vmid is reduced to the transient state threshold Vth_ts, the conversion control circuit 203 controls the switching power converter 201 to enter the battery power supply mode (i.e., the reverse boost mode) after the conversion control circuit 203 controls the switching power converter 201 to perform a transient state operation (at a time point t3 shown in FIG. 8A), such that a minimum of the intermediate voltage Vmid is close to the minimum voltage regulation level Vmivr. During a transient state operation time period, the conversion control circuit 203 is configured to operably control the switching power converter 201 to perform the transient state operation in an open-loop scheme.

Figure 8B:
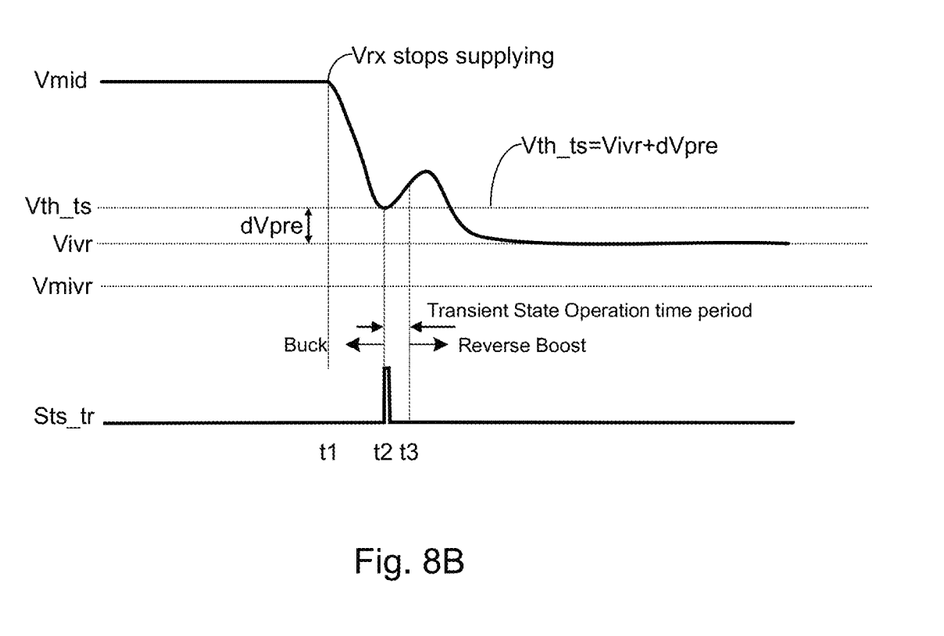
FIG. 8B illustrates signal waveform diagrams depicting signals associated with the operation of a power conversion system according to still another embodiment of the present invention.

FIG. 8B illustrates signal waveform diagrams depicting signals associated with the operation of a power conversion system according to still another embodiment of the present invention. The signal waveform diagrams of this embodiment shown in FIG. 8B are similar to the signal waveform diagrams of the embodiment shown in FIG. 8A, but is different in that: in the signal waveform diagrams of this embodiment shown in FIG. 8B, the conversion control circuit 203 controls the switching power converter 201 to enter the battery power supply mode (i.e., a boost mode), after the conversion control circuit 203 controls the switching power converter 201 to perform a transient state operation (at a time point t3 shown in FIG. 8B), so as to regulate an intermediate voltage Vmid to an intermediate regulation level Vivr, wherein the intermediate regulation level Vivr is greater than or equal to a minimum voltage regulation level Vmivr. It is worthwhile mentioning that, based upon the embodiment shown in FIG. 4 and the embodiment shown in FIG. 5, although the intermediate voltage Vmid may be ramp across the transient state threshold Vth_ts during the detection, the intermediate voltage Vmid can alternatively be regulated to the intermediate regulation level Vivr in the battery power supply mode.

Figure 9:
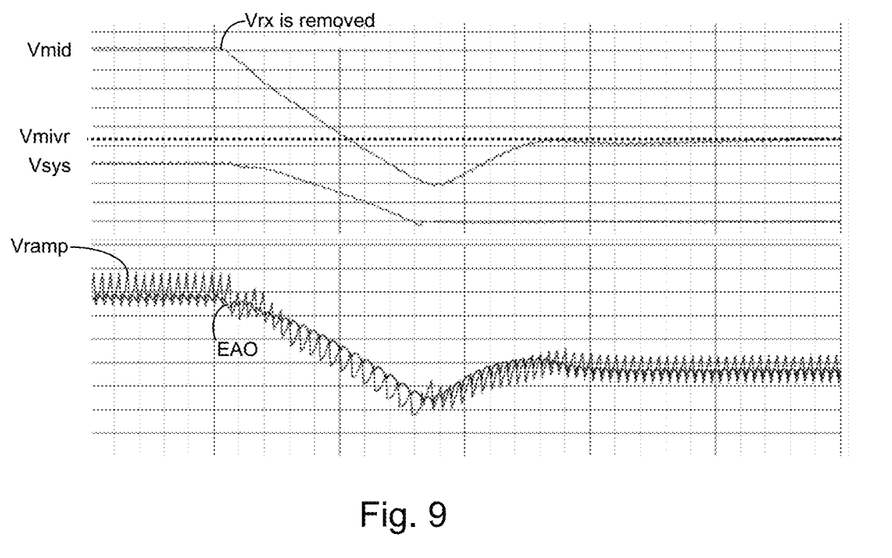
FIG. 9 illustrates signal waveform diagrams depicting signals associated with the operation of a power conversion system according to still another embodiment of the present invention.

FIG. 9 illustrates simulated signal waveform diagrams depicting signals associated with the operation of a power conversion system according to still another embodiment of the present invention. The intermediate voltage Vmid, a minimum voltage regulation level Vmivr, the system voltage Vsys, the ramp signal Vramp and the multi-loop error amplification signal EAO are shown in FIG. 9.

Figure 10:
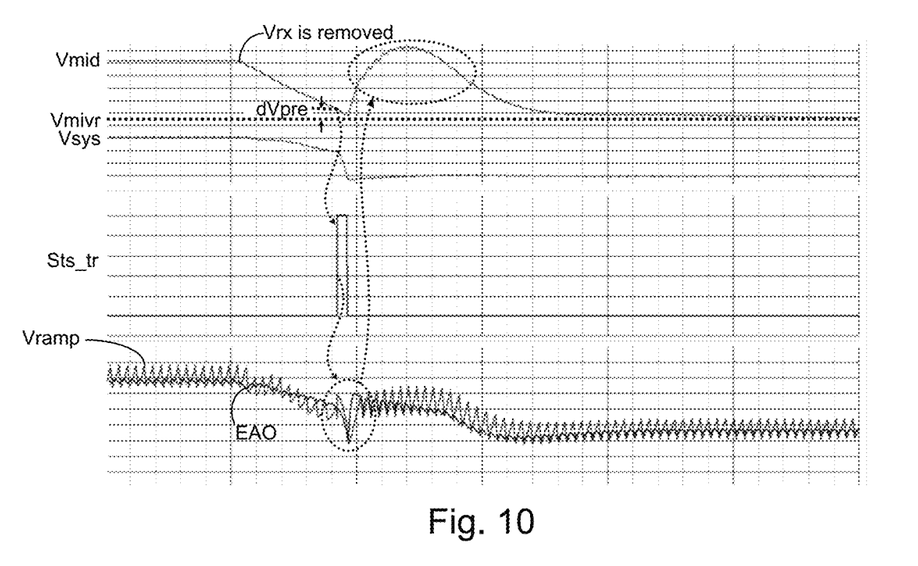
FIG. 10 illustrates signal waveform diagrams depicting signals associated with the operation of a power conversion system according to still another embodiment of the present invention.

FIG. 10 illustrates simulated signal waveform diagrams depicting signals associated with the operation of a power conversion system according to still another embodiment of the present invention.
The intermediate voltage Vmid, the minimum voltage regulation level Vmivr, the system voltage Vsys, the ramp signal Vramp and a multi-loop error amplification signal EAO are shown in FIG. 10.

As described above, the power conversion system of the present invention can ensure that an intermediate voltage will not be lower to an extent that the intermediate voltage reaches to a battery voltage, such that unwanted reset or shutdown of an external load connected to an output power can be prevented.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:
1. A power conversion system, comprising:
a first switch, which is coupled between a first terminal and an intermediate node;
a second switch, which is coupled between a second terminal and the intermediate node;
a switching power converter, which is coupled between the intermediate node and a system node;
a battery switch, which is coupled between the system node and a battery; and
a conversion control circuit, which is configured to operably control the first switch, the second switch, the battery switch and the switching power converter, so as to control power conversion among a first power at the first terminal, a second power at the second terminal, an intermediate power at the intermediate node, a system power at the system node and a battery power at the battery;
wherein in an external power supply mode, the conversion control circuit is configured to operably control the first switch to be ON to conduct the first power to generate the intermediate power, and the conversion control circuit is configured to operably control the second switch to be ON to conduct the intermediate power to generate the second power for powering an external load, and the conversion control circuit is configured to operably control the switching power converter to convert the intermediate power to the system power for powering a system load;
wherein in a battery power supply mode, the conversion control circuit is configured to operably control the battery switch to be ON to conduct the battery power to generate the system power, and the conversion control circuit is configured to operably control the switching power converter to convert the system power to the intermediate power, and the conversion control circuit is configured to operably control the second switch to be ON to conduct the intermediate power to generate the second power for powering the external load, wherein the intermediate power includes an intermediate voltage, wherein the intermediate voltage is regulated to an intermediate regulation level;
wherein in the external power supply mode, when the intermediate voltage is reduced to a transient state threshold, the conversion control circuit is configured to operably control the switching power converter to enter the battery power supply mode, wherein the intermediate regulation level is close to a minimum voltage regulation level or the intermediate regulation level is not lower than the minimum voltage regulation level.
2. The power conversion system of claim 1, wherein in the external power supply mode, when the intermediate voltage is reduced to the transient state threshold, the switching power converter enters the battery power supply mode, after the conversion control circuit controls the switching power converter to perform a transient state operation, such that a minimum of the intermediate voltage is not lower than the intermediate regulation level;

wherein during a transient state operation time period, the conversion control circuit is configured to operably control the switching power converter to perform the transient state operation in an open-loop scheme.

3. The power conversion system of claim 2, wherein the transient state threshold is equal to a sum of the intermediate regulation level and a predetermined offset value, wherein the predetermined offset value is sufficiently large to an extent that the minimum of the intermediate voltage is not lower than the intermediate regulation level.

4. The power conversion system of claim 2, wherein the conversion control circuit includes:

a multi-loop error amplifier circuit, which is configured to operably generate a multi-loop error amplification signal;

a pulse width modulation (PWM) comparator, which is configured to operably compare the multi-loop error amplification signal with a ramp signal to generate a PWM signal, wherein the PWM signal is configured to operably control at least one conversion switch, of the switching power converter, for switching, so as to regulate a system voltage of the system power in the external power supply mode or regulate the intermediate voltage in the battery power supply mode; and a transient state control circuit, which is configured to operably adjust the multi-loop error amplification signal in the transient state operation, so as to control the at least one conversion switch, of the switching power converter, for switching, such that the minimum of the intermediate voltage is not lower than the intermediate regulation level.

5. The power conversion system of claim 4, wherein the transient state operation time period is a constant time period, or wherein the transient state operation time period starts when the intermediate voltage is reduced to the transient state threshold and ends when a system voltage of the system power is equal to a battery voltage of the battery power.

6. The power conversion system of claim 5, wherein the multi-loop error amplifier circuit includes: a first amplifier and a second amplifier;

wherein in the external power supply mode, the first amplifier is configured to operably amplify a difference between a constant voltage mode reference voltage and a system feedback voltage related to the system voltage, so as to generate the multi-loop error amplification signal;

wherein in the battery power supply mode, the second amplifier is configured to operably amplify a difference between an intermediate feedback voltage related to the intermediate voltage and an intermediate reference voltage, so as to generate the multi-loop error amplification signal;

wherein the second amplifier is further configured to operably compare the intermediate feedback voltage with the intermediate reference voltage, so as to generate a transient state trigger signal which indicates whether the intermediate voltage is reduced to the transient state threshold;

wherein the transient state control circuit includes:

a bypass switch, which is coupled between the multi-loop error amplification signal and the ramp signal; and a timer circuit, which is configured to operably control the bypass switch, based upon the transient state trigger signal, to be ON to conduct the multi-loop error amplification signal to the ramp signal, thereby accomplishing the transient state operation;

wherein after the timer circuit has counted for the constant time period, the timer circuit is configured to operably control the bypass switch to be OFF, so as to cease conducting the multi-loop error amplification signal to the ramp signal; or wherein the timer circuit is configured to operably control the bypass switch to be OFF, when the system voltage is determined to be equal to the battery voltage, to cease conducting the multi-loop error amplification signal to the ramp signal.

7. The power conversion system of claim 1, wherein the transient state threshold is equal to the intermediate regulation level.

8. The power conversion system of claim 1, wherein the first power is a wireless receiver power and/or the second power is an output power complying with a supplement to the Universal Serial Bus (USB) specification for USB On-The-Go (USB OTG).

9. The power conversion system of claim 1, wherein in the external power supply mode, the switching power converter is configured to operably convert the intermediate power to the system power via a buck conversion scheme, and wherein in the battery power supply mode, the switching power converter is configured to operably convert the system power to the intermediate power via a boost conversion scheme.

10. A power conversion method, comprising following steps:

in an external power supply mode, controlling a first switch to be ON to conduct a first power at a first terminal to an intermediate node to generate an intermediate power, and controlling a second switch to be ON to conduct the intermediate power to a second terminal to generate a second power for powering an external load, and controlling a switching power converter to convert the intermediate power to a system power at a system node for powering a system load; wherein the first switch is coupled between the first terminal and the intermediate node, the second switch is coupled between the second terminal and the intermediate node and the switching power converter is coupled between the intermediate node and the system node; and in a battery power supply mode, controlling a battery switch to be ON to conduct a battery power of a battery to generate the system power, and controlling the switching power converter to convert the system power to the intermediate power, and controlling the second switch to be ON to conduct the intermediate power to generate the second power for powering the external load; wherein the battery switch is coupled between the system node and the battery, wherein the intermediate power includes an intermediate voltage, wherein the intermediate voltage is regulated to an intermediate regulation level;

wherein in the external power supply mode, the switching power converter is controlled to enter the battery power supply mode when the intermediate voltage is reduced to a transient state threshold, wherein the intermediate regulation level is close to a minimum voltage regulation level or the intermediate regulation level is not lower than the minimum voltage regulation level.

11. The power conversion method of claim 10, wherein in the external power supply mode, the switching power converter is controlled to enter the battery power supply mode, after the conversion control circuit controls the switching power converter to perform a transient state operation, such that a minimum of the intermediate voltage is not lower than the intermediate regulation level;

wherein during a transient state operation time period, controlling the switching power converter to perform the transient state operation in an open-loop scheme.

12. The power conversion method of claim 11, wherein the transient state threshold is equal to a sum of the intermediate regulation level and a predetermined offset value, wherein the predetermined offset value is sufficiently large to an extent that the minimum of the intermediate voltage is not lower than the intermediate regulation level.

13. The power conversion method of claim 11, wherein the step of controlling the switching power converter to convert the intermediate power to the system power or the step of controlling the switching power converter to convert the system power to the intermediate power includes following steps:

generating a multi-loop error amplification signal;
comparing the multi-loop error amplification signal with a ramp signal to generate a PWM signal, wherein the PWM signal is configured to operably control at least one conversion switch, of the switching power converter, for switching, so as to regulate a system voltage of the system power in the external power supply mode or regulate the intermediate voltage in the battery power supply mode;
wherein the step of controlling the switching power converter to perform the transient state operation in the open-loop scheme during the transient state operation time period includes following steps:
adjusting the multi-loop error amplification signal in the transient state operation, so as to control the at least one conversion switch, of the switching power converter, for switching, such that the minimum of the intermediate voltage is not lower than the intermediate regulation level.

14. The power conversion method of claim 13, wherein the transient state operation time period is a constant time period, or wherein the transient state operation time period starts when the intermediate voltage is reduced to the transient state threshold and ends when a system voltage of the system power is equal to a battery voltage of the battery power.

15. The power conversion method of claim 14, wherein the step of generating the multi-loop error amplification signal includes following steps:

in the external power supply mode, amplifying a difference between a constant voltage mode reference voltage and a system feedback voltage related to the system voltage, so as to generate the multi-loop error amplification signal; and
in the battery power supply mode, amplifying a difference between an intermediate feedback voltage related to the intermediate voltage and an intermediate reference voltage, so as to generate the multi-loop error amplification signal.

16. The power conversion method of claim 15, wherein the step of controlling the switching power converter to convert the intermediate power to the system power or the step of controlling the switching power converter to convert the system power to the intermediate power further includes following steps:

comparing the intermediate feedback voltage with the intermediate reference voltage, so as to generate a transient state trigger signal which indicates whether the intermediate voltage is reduced to the transient state threshold.

17. The power conversion method of claim 16, wherein the step of adjusting the multi-loop error amplification signal in the transient state operation includes following steps:

conducting the multi-loop error amplification signal to the ramp signal based upon the transient state trigger signal, so as to accomplish the transient state operation; and
ceasing conducting the multi-loop error amplification signal to the ramp signal after the constant time period has been counted; or
ceasing conducting the multi-loop error amplification signal to the ramp signal when the system voltage is equal to the battery voltage.

18. The power conversion method of claim 10, wherein the transient state threshold is equal to the intermediate regulation level.

19. The power conversion method of claim 10, wherein the first power is a wireless receiver power and/or the second power is an output power complying with a supplement to the Universal Serial Bus (USB) specification for USB On-The-Go (USB OTG).

20. The power conversion method of claim 10, wherein in the external power supply mode, the switching power converter is configured to operably convert the intermediate power to the system power via a buck conversion scheme, and wherein in the battery power supply mode, the switching power converter is configured to operably convert the system power to the intermediate power via a boost conversion scheme.

* * * * *